Oct. 19, 1926.

J. MILLIS 1,603,623

FRAMED STRUCTURE AND CONNECTING JOINT FOR SAME

Filed August 26, 1925    2 Sheets-Sheet 1

Inventor
John Millis,
By Wilkinson & Ginota
Attorneys.

Oct. 19, 1926.                                               1,603,623
                         J. MILLIS
         FRAMED STRUCTURE AND CONNECTING JOINT FOR SAME
                  Filed August 26, 1925         2 Sheets-Sheet 2
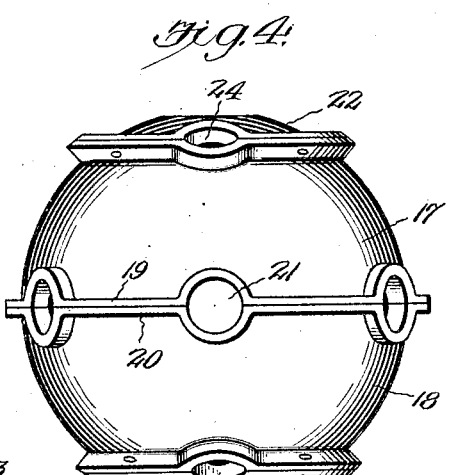
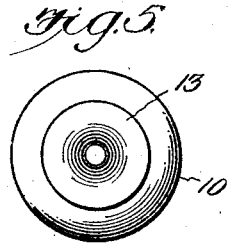
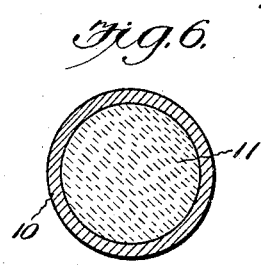
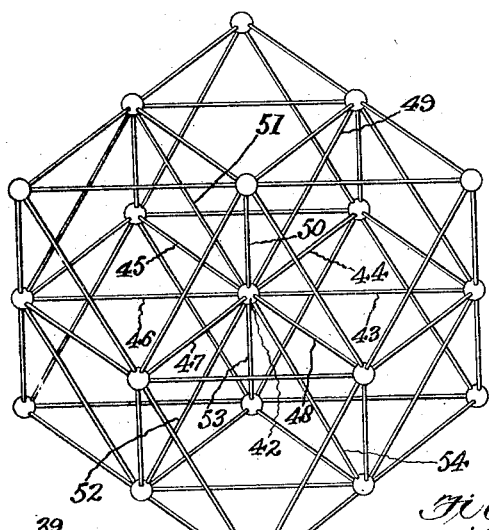
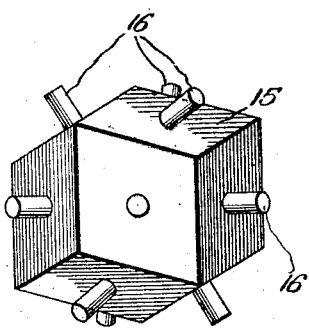
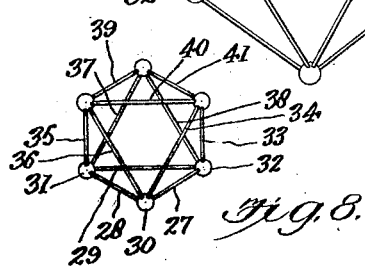
Inventor
John Millis,
By Wilkinson & Giusta
       Attorneys.

Patented Oct. 19, 1926.

1,603,623

UNITED STATES PATENT OFFICE.

JOHN MILLIS, OF CLEVELAND, OHIO.

FRAMED STRUCTURE AND CONNECTING JOINT FOR SAME.

Application filed August 26, 1925. Serial No. 52,696.

The present invention relates to improvements in framed structures and connecting joints for same, and has for an object to provide an improved joint possessing by comparison with present types of constructional joints marked superiority in point of strength and resistance, especially with respect to stresses of both compression and tension of a longitudinal nature in the members connected together by this form of joint.

Another object of the invention is to provide an improved joint in which the various beams or members forming the components of the structure may be united closely and strongly together so as to form a framework or construction which will be advantageously adapted as a whole to resist sudden, irregular and reversing stresses of a racking and torsional nature, like those produced in a house or other building by earthquakes and tornadoes or severe storms.

The improved joint will be found particularly adaptable to use in framed structures built following the octahedral system, in which the octahedron or polyhedron with eight equal edges is a unit of the structure, these being combined and multiplied to any desired extent depending upon the size and general nature of the structure required. In such a system of construction each of the members designated as beams is to be adapted to resist both stresses of compression and of tension, longitudinally, unlike ordinary framed structures which are generally designed with two distinct classes of members adapted separately to compression stresses and tension stresses respectively.

With the foregoing and other objects in view, the invention will be more fully described hereinafter in conjunction with the accompanying drawings, and will be more particularly pointed out in the appended claims.

In the drawings, wherein like parts are denoted by like symbols through the several views:

Figure 4 is a side view of this same casing.

Figure 5 is an end view of one of the beams or members of the structure.

Figure 6 is a cross section taken intermediately through one of said members.

Figure 7 is a side view of the joint block.

Figure 8 is a diagrammatic view of the unit of structure, namely, the octahedron, and Figure 9 is also a diagrammatic view showing a built up structure comprising a number of the octahedrons assembled, with connecting auxiliary members, in all respects similar to the members forming the unit octahedrons.

Figure 1:
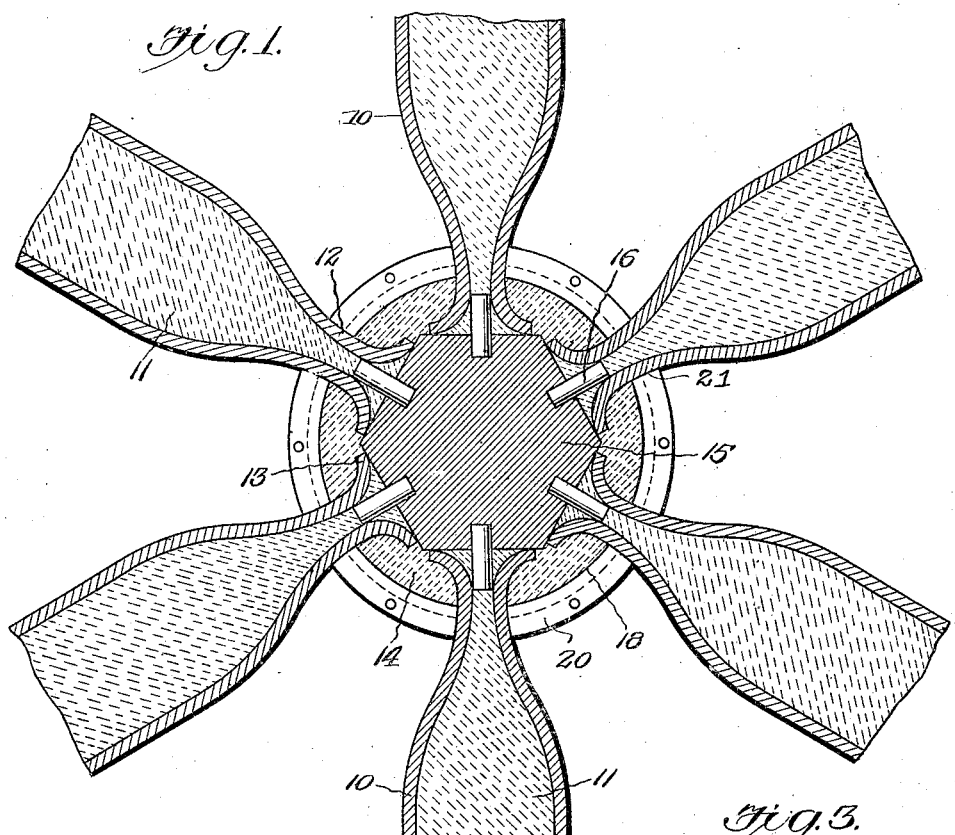
Figure 1 is a horizontal section taken through an improved joint constructed according to the present invention.

Referring more particularly to the drawings and for the present to the Figures 1 to 7 inclusive, 10 designate beams or members composing the structure, each of which is adapted to both compression stresses and stresses of extension, longitudinally. These members may be tubes of metal of pipe-like form containing a filling of concrete or other material 11 placed while in a plastic state, which adds strength and stiffness to the beam. The ends of the beam or tube 10 are rolled or forged or otherwise operated upon to form rounded reduced necks 12 having outwardly flaring flanges or mouths 13 in which the mouth extends beyond the neck to a considerable extent and forms an abutment against which the concrete or other plastic body 14 which envelops the joint block 15 presses and binds.

Figures 2, 3:
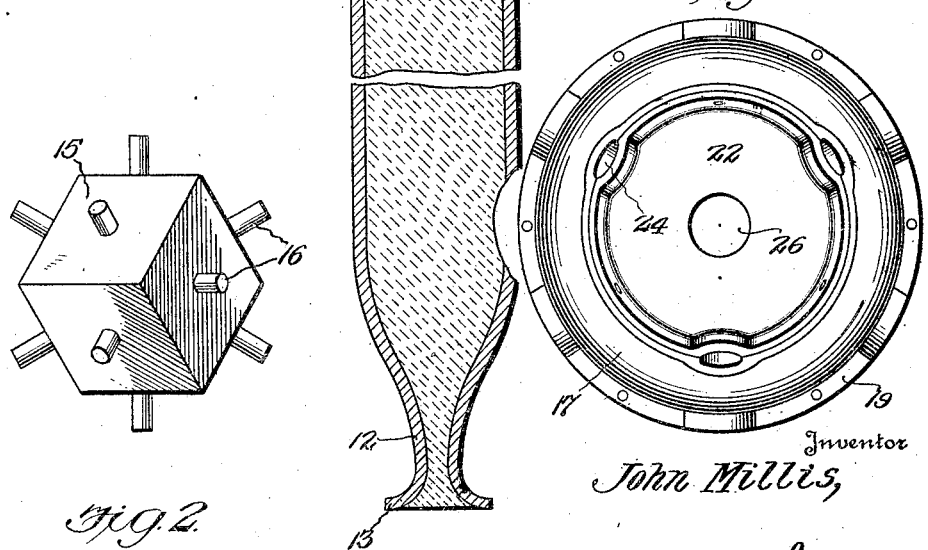
Figure 2 is a top plan view of the joint block.
Figure 3 is a similar view of the joint enclosing casing.

The joint block 15 is preferably of solid material, metal being advantageous for the purpose, and the block is constructed with at least as many faces as there are beams or members at the joint. In the present case, the block is shown to have six vertical faces for taking the flanges 13 of the six horizontally extending members or beams. This construction is shown in Figure 1. At substantially the central portion of each face is a dowel pin 16 of a size to be received within the interior of the constricted neck 12. The dowels center the beams and they provide ease and convenience in the assembly, and they also have some considerable effect in preventing lateral movement of the beams. The dowels furthermore serve to hold the beams in right alinement during the setting of the concrete body 14. The block 15 is, as shown in Figures 2 and 7, provided with three quadrilateral faces above the center line and three quadrilateral faces below the center line to take six additional beams extending above and below the joint. Of course, a greater or lesser number of the beams and block faces may be provided in accordance with the strength and character of the structure in which the joint is employed. The block 15 and body 14 are enclosed within a casing, as shown, in which 17 and 18 designate hemispherical parts of the casing, these parts being provided with perforated flanges 19 and 20 which come together and are bolted, riveted, welded or otherwise secured. The flanges and the adjacent parts of the sections 17 and 18 are provided with openings 21 through which the beams or members are adapted to extend preferably at the reduced necks 12. The necks being narrow, will not require large openings in the casing sections, and the greater strength is in this way obtained. The sections 17 and 18 are provided with cover plates 22 and 23, also provided with flanges as indicated and openings 24 and 25 along the flanged meeting lines in order to permit of the attachment of the other members or beams and assembling of the complete joint.

In the use of the device, the beams are assembled about the block 15 in any number in accordance with the size and shape of the block and the design of the structure. The beams are fitted upon the dowels and are supported temporarily in this position until the casing sections can be put in place and secured together, whereupon concrete is poured for instance through an opening 26 in the top cover 22 until a plastic body is formed entirely filling the casing and surrounding the necks and heads of the beams. The temporary supports are continued in place until the concrete is hardened or set, and they are then removed. The interior surfaces of the flanges or heads 13 and the necks 12 are rounded or flared in order to guide the dowel pins thereinto, but the dowel pins fit into substantially cylindrical inner portions of the necks where they find a rather extensive bearing for preventing lateral play of the members.

The invention may, of course, be applied to all types and styles of constructions, but the joint is found particularly applicable to the octahedral system of framing. The octahedral unit is shown in Figure 8 in which 27, 28 and 29 represent the three base members associated in triangular formation and coupled to the joints 30, 31 and 32. These joints also receive the lower ends of the legs or members 33, 34, 35, 36, 37 and 38. The upper ends of these are then jointed in similar manner and connected by similar members 39, 40 and 41. This is recognized to be an exceedingly stable structure. In Figure 9 there is shown a built up structure involving an assembly of the octahedral units such as shown in Figure 8. If we take the center joint designated 42 and assume that this is the casing surrounding a joint block such as has been described heretofore we find that there are six horizontal beams 43, 44, 45, 46, 47 and 48, all radiating horizontally. Top beams 49, 50 and 51 connect with the upper three faces of the block and the lower beams 52, 53 and 54 connect with the lower three faces of the joint block 42. These various beams or members extend to other joint blocks and joint casings having more or less faces according to the number of members converging thereto. A skeleton device such as shown in Figure 9 may be built up to any height, length and breadth and varied in external form as desired, and the entire structure may be enclosed within a mass of concrete to form a wall or column construction having great strength; brick work may be built up within the skeleton structure and the beams and members of the frame work will reinforce the masonry. A structure such as referred to may also form the frame of a house or other building or construction, or of a floating boat or vessel, and great stability will be inherent therein due to the octahedral formation and the exceedingly strong and stress resisting character of the improved joint.

It is obvious that various changes and modifications may be made in the herein described embodiment of this invention without departing from the spirit thereof, such changes and modifications being restricted only by the scope of the following claims.

What is claimed is:

1. An improved joint for building construction comprising a block and connecting beams or members having fillings like concrete placed in a plastic state assembled upon the block, said beams having flanged ends for engaging the block, a casing extending about the block and the flanged ends of the beams, and a filling within the casing and extending about the block and the engaged flanges of the beams.

2. An improved joint for building construction comprising a central block having a plurality of faces, beams provided with flanges fitted against the faces of said block, said beams having narrow necks inwardly of the flanges, a plastic body extending about the block and about the necks and flanges of said beams, and a casing for enclosing the plastic body and said necks and flanges of the beams.

3. A joint for building construction comprising a faceted block having dowels extending from the faces thereof, tubular beams having reduced necks and wide flanges fitted against the faces of the block and about the dowels, a body of plastic material extending about said block and the flanges, and an enclosing casing for the plastic body and the block and engaged ends of the beams.

4. A joint for building construction comprising a central solid block having a number of faces with dowels at substantially the central portions of the faces, tubular beams having constricted necks at their ends with wider flanges beyond the necks, the inner portions of the flanges being flared to receive and guide the members on the dowels, said dowels adapted to fit in the outer portion of the constricted necks, the filling of plastic material extending about the block and the necks and flanges, and a casing surrounding the plastic body.

5. An improved joint for building construction comprising a block having faces with dowels projecting substantially centrally from the faces, beams of tubular metal, concrete filling within the tubular metal, said beams having rounded and reduced necks and provided with flared flanges beyond the necks adapted to fit against the faces of the block, the dowels adapted to be guided into the necks, a filling of concrete extending about said necks and the flanges and block, and a sectional casing fitted about the filling and about the constricted necks of the beams.

6. In an octahedral building construction, a central joint block having substantially six vertical faces and three pyramidal faces above and below said vertical faces, dowels extending out from all said faces, beams constructed of hollow metal having reduced necks with flanges outwardly of the necks, said necks adapted to fit against the faces of the block and about the dowels thereof, a filling of concrete extending about said flanges and block and adapted to bind all of the beams together, a casing made in two sections with meeting flanges and openings to extend about the necks of the beams, and upper and lower covers on said casing also having meeting flanges with openings therefrom to admit the upper and lower beams.

JOHN MILLIS.